R. A. GALLY.
PITMAN AND SPREADER.
APPLICATION FILED JAN. 9, 1918.

1,272,249.

Patented July 9, 1918.

WITNESSES:
Herschel E. Power.
Jerome G. Williams.

INVENTOR:
Robt. A. Gally.

UNITED STATES PATENT OFFICE.

ROBERT A. GALLY, OF CINCINNATI, OHIO, ASSIGNOR TO THE BALDWIN COMPANY, OF CINCINNATI, OHIO.

PITMAN AND SPREADER.

1,272,249.

Specification of Letters Patent.

Patented July 9, 1918.

Original application filed July 30, 1917, Serial No. 183,576. Divided and this application filed January 9, 1918. Serial No. 211,080.

*To all whom it may concern:*

Be it known that I, ROBERT A. GALLY, a citizen of the United States, and residing at Cincinnati, in the county of Hamilton and State of Ohio, have invented certain new and useful Improvements in Pitmen and Spreaders, of which the following is a specification.

In this applicant's prior application #41,134, is shown a spring spreader pushing apart two opposed pumpers and thus holding closed the joints of the pitmen and the cranks. In the present invention an improved form of spreader is shown; also the broad combination of spring spreaders and flexible pitmen.

Figure 1:
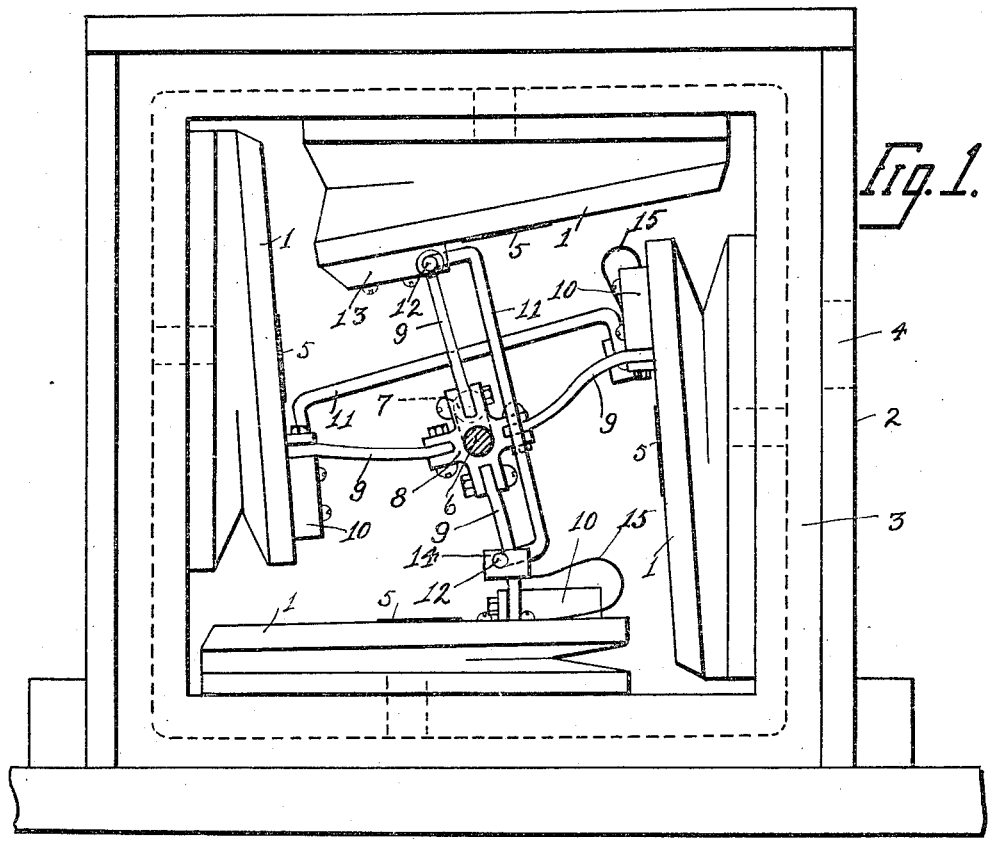
Figure 2:
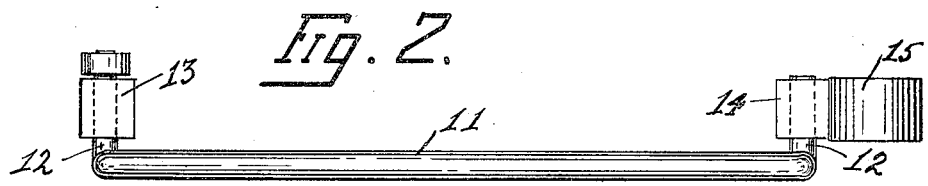

In the drawings Figure 1 is a reduced size front view of an air pump such as is used for a player piano, the front bearing and front end of the crank shaft removed to allow a clear view of crank and crank block and the spreaders; and Fig. 2 is a larger scale view of one of the spreaders showing the bends at its ends.

Four pumpers 1 are shown attached to the four inner faces of a rectangular frame or box 2 which has wind ways 3 leading from all four of said pumpers to a common service port 4 adapted to be connected to any suitable apparatus to be affected by the air service to or from this motor or pump, the apparatus being usable as either a motor or pump, suitable valves being provided to each pumper, of the present structure hereof, only the outer valves 5 being shown.

A crank 6 is revoluble about a central shaft 7, and on this crank 6 is mounted a single floating crank block 8 to which are attached four flexible pitmen 9 made of strong leather or other suitable material, each of which pitmen 9 is attached to its corresponding one of the pumpers 1 on a block 10 attached to said pump. The crank block 8 has four arms of a cross arrangement, each such arm having a slot for receiving a pitman 9.

A spreader 11 is placed from one pumper 1 to the opposite pumper 1 of each pair of opposed pumpers. The two ends 12 of each of these spreaders 11 have their axes parallel to the hinge lines of their pumpers and to the axis of the crank shaft 7 and its crank 6; so that as the pumpers 1 are moved by their pitman 9 and the crank block 8 and crank 6, these spreaders 11 have free action and their ends 12 are slightly revolved in their bearings in blocks 13 and 14, blocks 13 being each mounted directly on its one of one pair of opposed pumpers, the springs 15 pressing the opposed pumpers apart and thus holding the pitmen taut and the crank block snug to its crank. Thus any sliding or wearing of longitudinal motion of the spreader rods is avoided, being much superior to the sliding rods of the prior application #41,134, referred to above.

Each end 12 of each spreader 11 is not only put at right angles to the main part 11 of the same spreader, but there is preferably a second bend or offset made intermediate the length of each rod 11 to secure a clearance of such spreader 11 from the crank shaft 7 and yet have each end 12 of each spreader 11 at the same distance from the hinge of the pumper 1 to which it is attached as is the end 12 of that same spreader 11 from the hinge of the pumper 1 to which that other end 12 of that spreader 11 is attached. If it were not for this special bend or offset, these two ends 12 at equal distances from the hinges of the two opposed pumpers to which a spreader was attached would bring the main part of such a spreader directly across the axis of the crank shaft 7, a mechanical impossibility.

While a spring is very useful with ordinary stiff pitmen as in the prior application #41,134, it is even more necessary with flexible pitmen, for a flexible pitman has no proper and certain control of the return movement of the pumper, not being capable of a proper movement if its flexibility is sufficient for free working on its pulling movement from its fixed ends in the blocks 8 and 10.

Flexible pumper connections and pitmen are old in reed and pipe organs, but the details of spring spreaders, as well as the combination of flexible pitmen and spring spreaders are novel, and which had been previously set forth with other matter in my application #183,576 from which this application is divided, but not claimed therein; but are the matters of what I now claim as my invention, which is:—

1. Two opposed hinged pumpers; a revoluble crank therebetween; pitmen from said crank to each said pumper; and a spreader rod between the said two pumpers and attached to both said pumpers at the ends of said rod, each said end of said rod having its extreme part at a right angle to the main part of said rod, and the axis of each said right angle end part parallel to the hinge lines of the two pumpers.

2. Two opposed hinged pumpers; a revoluble crank therebetween; pitmen from said crank to each said pumper; and a spreader between the two said pumpers and attached to both said pumpers, the said attachment to one of said pumpers comprising a spring directly mounted on said pumper and supporting its end of the said spreader.

3. Two opposed hinged pumpers; a revoluble crank therebetween; pitmen from said crank to each said pumper; and a spreader between the two said pumpers and attached to both said pumpers, the said attachment to one of said pumpers comprising an expansion spring directly mounted on said pumper and supporting its end of the said spreader.

4. Two opposed pumpers; a revoluble shaft having a crank therewith and between the said two pumpers; pitmen from said crank to each said pumper; and a spreader between the said two pumpers, the ends of said spreader attached to both said pumpers, the positions of said ends being on a line extended through said shaft, the intermediate part of said spreader offset to one side of the said shaft.

5. Two opposed pumpers; a revoluble shaft having a crank therewith and between the said two pumpers; flexible pitmen from said crank to each said pumper; and an expansion spreader between the said two pumpers and attached to both the said pumpers.

6. Two opposed pumpers; a revoluble shaft having a crank therewith and between the said two pumpers; a floating crank block journaled on said crank; and flexible pitmen from said crank to each said pumper; and an expansion spreader between the said two pumpers and attached to both the said pumpers.

7. A revoluble shaft having a crank therewith; four pumpers disposed in rectangular arrangement around said shaft and crank; a floating crank block journaled on said crank; a flexible pitman from each said pumper to the said floating crank block; the said four pumpers disposed in two pairs, each pair at opposed sides of the said rectangle, and two expansion spreaders, each one of said spreaders attached to its pair of opposed pumpers.

8. A revoluble shaft having a crank therewith; four pumpers disposed in rectangular arrangement around said shaft and crank; a floating crank block journaled on said crank; a pitman from each said pumper to the said floating crank block; the said four pumpers disposed in two pairs, each pair at opposed sides of the said rectangle, and two expansion spreaders, each one of said spreaders attached to its pair of opposed pumpers.

ROBT. A. GALLY.

Witnesses:
P. J. HENGGE,
NORMA KEISER.

Copies of this patent may be obtained for five cents each, by addressing the "Commissioner of Patents, Washington, D. C."